United States Patent [19]

Narimatsu et al.

[11] 4,429,276

[45] Jan. 31, 1984

[54] MAGNETORESISTIVE DISPLACEMENT SENSOR AND SIGNAL REPROCESSING CIRCUITS THEREFOR

[75] Inventors: Akihisa Narimatsu, Naka; Hiroyuki Ohkubo, Chiba, both of Japan

[73] Assignee: Sony Corporation, Tokyo, Japan

[21] Appl. No.: 368,504

[22] Filed: Apr. 15, 1982

Related U.S. Application Data

[63] Continuation of Ser. No. 88,811, Oct. 29, 1979, abandoned.

[30] Foreign Application Priority Data

Oct. 27, 1978 [JP] Japan ................................ 53-132810

[51] Int. Cl.³ ........................ G01B 7/14; H01L 43/00
[52] U.S. Cl. .................................. 324/207; 324/252; 338/32 R; 340/870.38
[58] Field of Search ............... 340/870.31, 870.32, 340/870.33, 870.38; 324/207, 208, 252; 338/32 R; 360/113

[56] References Cited

U.S. PATENT DOCUMENTS 3,582,924  6/1971  Uemura et al. ............... 340/870.33
3,949,345  4/1976  Makino et al. .................. 338/32 R

FOREIGN PATENT DOCUMENTS 1262877  2/1972  United Kingdom .
1270875  4/1972  United Kingdom .
1492980  11/1977  United Kingdom .
1495320  12/1977  United Kingdom .

*Primary Examiner*—James J. Groody
*Attorney, Agent, or Firm*—Lewis H. Eslinger; Alvin Sinderbrand

[57] ABSTRACT

A magnetoresistive displacement sensing transducer employs a plurality of sensing elements consisting of magnetically biased magnetoresistive stripes. Each sensing element is operative to produce a signal in response to linear or rotational displacement with respect to a magnetic grating. The phases of the signals from the plurality of sensing elements are relatively displaced to permit determining direction of displacement and to increase accuracy through interpolation. A signal processing circuit uses the signals from the sensing elements and optionally their sums and differences to drive a reversible counter which is thereby updated to retain a value corresponding to the position of the transducer or the magnetic grating.

15 Claims, 72 Drawing Figures

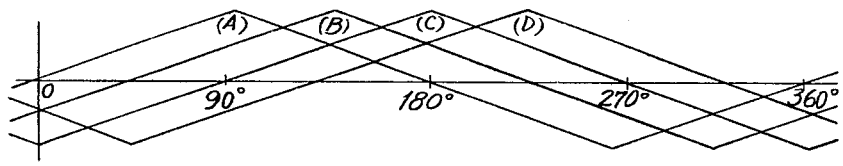
FIG.16A
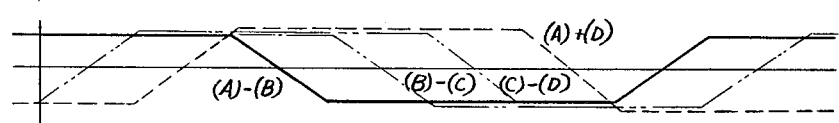
FIG.16B
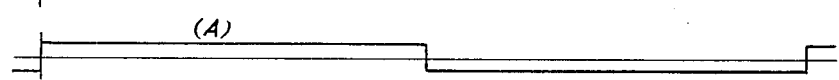
FIG.16C
FIG.16D
FIG.16E
FIG.16F
FIG.16G
FIG.16H
FIG.16I
FIG.16J
FIG.16K
FIG.16L
FIG.16M
FIG.16N
FIG.16O
FIG.16P
FIG.16Q
FIG.16R
FIG.16S

MAGNETORESISTIVE DISPLACEMENT SENSOR AND SIGNAL REPROCESSING CIRCUITS THEREFOR

This is a continuation of application Ser. No. 088,811 filed Oct. 29, 1979 now abandoned.

BACKGROUND OF THE INVENTION

This invention relates to a magnetoresistive displacement sensing transducer cooperating with a magnetic grating to sense relative linear or rotational displacement. More particularly this invention relates to apparatus for sensing relative displacement of a magnetic grating using sensing elements consisting of anisotropic magnetoresistive stripes and to signal processing apparatus therefor.

A magnetoresistive sensing transducer is described in U.S. Pat. No. 3,949,345, the disclosure of which is incorporated herein by reference. The reference U.S. patent discloses a magnetoresistive sensing element consisting of first and second sets of parallel strips of anisotropic magnetoresistive material such as, for example, nickel-cobalt or nickel-iron desposited on, or etched from a layer on an insulating substrate. The stripes and their interconnecting conductors are preferably deposited by standard thin-film techniques on a suitable substrate such as glass. All stripes in a sensing element are connected in series between the terminals of a voltage source and an output terminal is provided at the junction of the first and second sets of stripes.

An anisotropic magnetoresistive material has a resistivity (specific resistance) that varies according to the direction of a magnetic field applied thereto. When a magnetic field is perpendicular to current in the stripes, the resistivity thereof is minimum; and when the magnetic field is parallel to current in the stripes, the resistivity thereof is maximum. The resistance of a stripe of uniform thickness is proportional to the length and inversely proportional to the width thereof.

A magnetic grating disposed adjacent the sensing element has alternating north and south poles in the direction of relative displacement. The spacing between corresponding magnetic poles (e.g. from north pole to adjacent north pole) defines the pitch or wavelength $\lambda$ of the magnetic grating. The spacing between the first and second sets of stripes is established relative to the wavelength of the magnetic grating such that when the first set of stripes exhibits maximum resistivity, the second set of stripes exhibits minimum resistivity and vice versa. The first and second sets of stripes form a voltage divider with an output being taken across one of the sets of stripes. Since the resistivity (and resistance) of the two sets of stripes vary in opposite directions as the relationship between them and the magnetic poles in the magnetic grating varies, the output also varies in proportion to such relationship.

The measurement resolution, or minimum displacement which can be sensed, using the sensing element of the referenced U.S. patent is determined by the minimum usable wavelength $\lambda$ of the magnetic grating which is, in turn, limited by the finite minimum size of the sets of stripes. In practice, resolution of better than 1 mm cannot be achieved without using relatively expensive phase modulation detection for interpolation.

In the device of the referenced U.S. patent, it is desirable to use a plurality of such sensing elements connected in series disposed in the direction of displacement. Using a plurality of sensing elements in this manner tends to make the device large. When the wavelength of the magnetic grating is, for example, 2 mm, and when the number of sensing elements is, for example, 10, the length of the set of 10 sensing elements is at least 40 mm.

The poor inherent resolution and the large size of the sensing device according to the referenced U.S. patent increases the cost of producing a practical sensing device.

An attempt has been made in Japanese Patent Application No. 114,699/1977 to improve resolution with reduced size by substituting a single one of a set of parallel magnetoresistive stripes for each of the plurality of sets of stripes in the referenced U.S. patent. The parallel stripes are electrically connected in series in zig-zag fashion. Each of the stripes depends on leakage magnetic flux from a single magnetic pole for controlling the resistivity thereof. However, when the wavelength $\lambda$ of the magnetic grating is reduced to improve the resolution of the device, the leakage magnetic flux is so drastically reduced that the related stripes are not saturated. This leads to problems with magnetic hysteresis.

A partial solution to attain saturation of the stripes with relatively short wavelength $\lambda$ of a magnetic grating includes depositing a thin film of high magnetic permeability to form closed magnetic paths about pairs of adjacent stripes. The closed magnetic paths induce increased leakage flux from the magnetic grating to thus increase the magnetic field to which the stripes are exposed sufficiently to achieve saturation and to avoid hysteresis effects.

The benefits derived from the use of thin-film closed magnetic paths are limited by the relatively low value of magnetic permeability attainable in a thin film.

A different approach to achieving saturation of the magnetoresistive stripes is described in an article entitled "Non-Contact Switch Is Based on Magnetoresistance", which appeared on page 3E in the May 1, 1975 issue of Electronics Magazine (McGraw-Hill). A bias magnetic field, on the order of 50 Oersteds, is applied to the magnetoresistive stripes to maintain them in the saturated condition. Thus any change in output due to proximity of the magnetic grating is free of interference from hysteresis. The article also notes that disposing the bias magnetic field at an angle of 45 degrees to the stripes reduces the originally small temperature coefficient of magnetoresistance to zero.

A further attempt to improve the resolution of a magnetoelectric transducer employs stripes of magnetoresistive material in a repeating symmetrical triangular wave pattern, having a wavelength equal to the wavelength $\lambda$ of the magnetic grating, to which a constant bias magnetic field is applied having a direction normal to the magnetic fields of the magnetic grating. Resultant magnetic field vectors are produced by the interaction of the north and south poles of the magnetic grating with the bias magnetic field. The resultant magnetic field vectors of the magnetic grating and the bias magnetic field are parallel to adjacent pairs of stripes at one position, yielding maximum resistivity, and make an angle with the magnetic stripes at another position yielding minimum resistivity. Two triangular wave patterns are simultaneously exposed to the fields of the magnetic grating. The two triangular wave patterns are so disposed that a maximum output signal from one pattern coincides with a minimum output signal from the other pattern and vice versa.

The triangular wave element has the disadvantage that reduced output efficiency results from the fact that the stripes of each adjacent pair are disposed over half the wavelength λ of the magnetic grating. This is believed to cause at least partial cancellation of the magnetoresistance effect.

OBJECTS AND SUMMARY OF THE INVENTION

It is an object of the invention to provide a magnetoresistive displacement sensor which overcomes the limitations of the prior art.

It is a further object of the invention to provide a magnetoresistive displacement sensor employing at least two magnetoresistive sensors each providing an output signal, wherein the two magnetoresistive sensors are spaced apart a distance which produces a phase difference in their outputs of less than 180 degrees.

According to an aspect of the invention, there is provided a magnetoresistive displacement sensor for use with at least one elongated magnetic grating having a wavelength comprising a first magnetoresistive sensor operative to produce a first output signal in response to displacement thereof with respect to the at least one magnetic grating, a second magnetoresistive sensor operative to produce a second output signal in response to displacement thereof with respect to the at least one magnetic grating, the first and second magnetoresistive sensors being fixed relative to each other and having an effective relative spacing therebetween which produces a relative phase difference between the first and second output signals of substantially less than 180 degrees.

According to a feature of the invention, the first and second magnetoresistive sensors each include at least two parallel stripes of magnetoresistive material having a relative spacing therebetween which produces magnetoresistance therein having relative phases of 180 degrees, the output signal being taken at a junction of the least two parallel stripes.

The above, and other objects, features and advantages of the present invention will become apparent from the following description read in conjunction with the accompanying drawings in which like reference numerals designate the same elements.

BRIEF DESCRIPTION OF THE DRAWINGS

FIGS. 16A-16S are waveforms to which reference will be made in describing the manner in which the outputs of a four-output magnetoresistive displacement sensor may be interpolated to provide 22.5 degree resolution;

DETAILED DESCRIPTION OF THE PREFERRED EMBODIMENTS

Before describing the embodiments of the present invention in detail, the embodiments according to the prior art discussed in connection with the background of the present invention will be briefly described.

Figure 1:
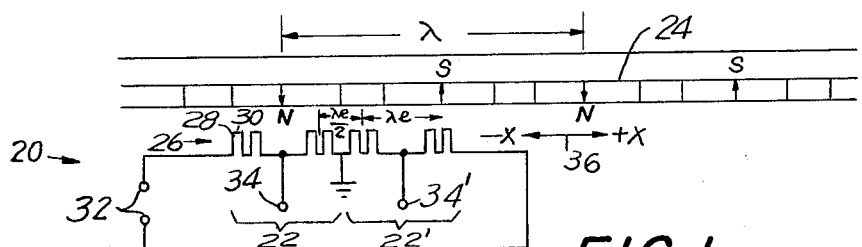
FIG. 1 is a schematic simplified view of a magnetoresistive sensor according to the prior art.

Referring to FIG. 1, a magnetoresistive sensor, shown generally at 20, has two groups of magnetoresistive elements 22 and 22', in close proximity to a magnetic grating 24 in which north and south magnetic poles repetitively alternate. The spacing between adjacent poles, for example, adjacent north poles, is defined as a wavelength λ of magnetic grating 24.

Each group of magnetoresistive elements, for example, group 22, consists of at least one magnetoresistive element which has at least one and preferably a plurality of parallel stripes 28. When a plurality of stripes 28 are employed, their ends are connected in serpentine fashion by relatively wide connecting conductors 30. The magnetoresistive elements 26 in each group 22, 22', are spaced apart by λe where e equals k/2 (k equals 1, 2, . . . ). In the embodiment shown, e equals ½ (k equals 1). The spacing between the right-most element in group 22 and the left-most element in group 22' is equal to n λe+λe/2. In the example shown, n=0 and spacing is equal to λ/4 (k=1). Due to the spacing between elements 26 in the same group 22 or 22', all stripes 28 in a group are similarly influenced by the magnetic fields of magnetic grating 24. For example, each magnetoresistive element 26 in group 22' is shown adjacent a pole of magnetic grating 24. In addition, due to inter-group spacing, each of magnetoresistive elements 26 in group 22 is disposed substantially midway between adjacent north and south poles and is therefore substantially uninfluenced by these magnetic fields. Consequently, all stripes 28 in group 22' exhibit maximum resistance due to the fact that the magnetic fields of magnetic grating 24 are parallel to stripes 28 and, at the same time, all stripes 28, not having a magnetic field parallel to current flow therein, exhibit minimum resistance.

An exciting voltage $V_E$ is applied to input terminals 32 and an output is taken from the junction of groups 22 and 22' for feeding to output terminals 34 and 34'.

As would be clear to one skilled in the art, as magnetoresistive sensor 20 is displaced in the direction indicated by double-headed arrow 36, the voltage at output terminal 34 varies according to the relationship of the wavelength λ of magnetic grating 24 to the spacing of magnetoresistive elements 26 in groups 22 and 22'. In the condition shown, the resistance of the right-hand elements 26 in group 22' is maximum and that of group 22 is minimum. This yields a minimum output voltage at output terminal 34'. If magnetoresistive sensor 20 is displaced a distance λ/4 in either direction indicated by the double-headed arrow 36, one of magnetoresistive elements 26 in group 22 becomes aligned with magnetic poles in magnetic grating 24 and those in group 22' are moved λ/4 out of alignment therewith. Thus, in this displaced position, the resistance of one of the elements 26 in group 22 is maximum and that of elements 26 in group 22' is minimum thus yielding a change in output voltage at output terminals 34 and 34'. If magnetoresistive sensor 20 is moved continuously in one direction or the other indicated by double-headed arrow 36, the output at output terminals 34 and 34' describe sinusoidal functions.

Figure 2:
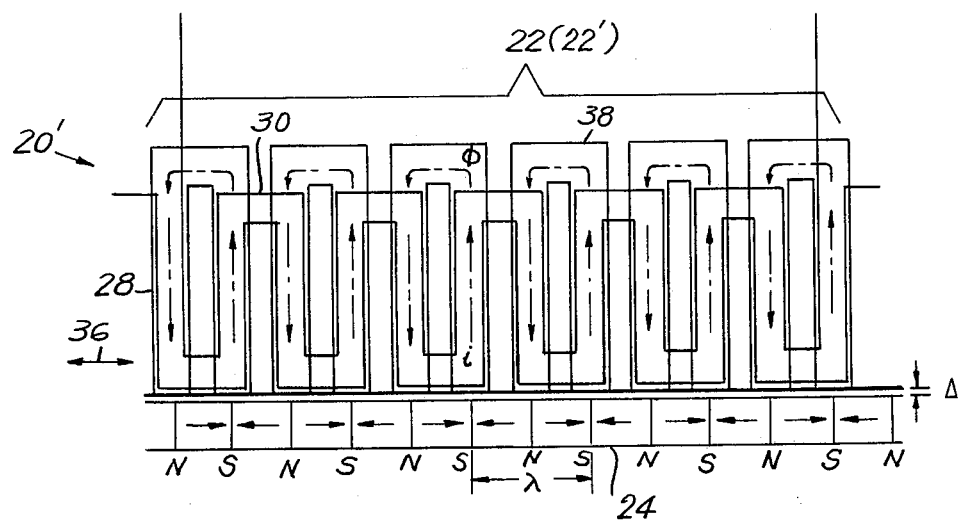
FIG. 2 is a close-up view of another magnetoresistive sensor according to the prior art showing magnetic paths for enhancing leakage flux.

Referring now to FIG. 2, there is shown an embodiment of the invention in which individual stripes 28 are spaced λ/2 apart and are disposed a distance Δ from a magnetic grating 24. In the condition shown, each stripe 28 is exposed to a north or south pole. In this condition, the leakage magnetic flux from magnetic grating 24 is substantially parallel to current flow i shown by the straight broken arrows. Thus, maximum resistance is exhibited in this position. With relative motion of magnetoresistive sensor 20', a distance of λ/4 in the direction shown by double-headed arrow 36, the resistance of the group 22 (or 22') of magnetoresistive elements becomes minimum.

As previously explained, the short wavelength λ interferes with saturation of stripes 28. For this reason, U-shaped magnetic paths 38 of material having a high magnetic permeability are formed preferably using thin-film techniques over adjacent pairs of stripes 28 to provide a flux path for the flux φ as shown by the U-shaped broken arrows. As previously described, the magnetic permeability μ of magnetic paths 38 is limited by available material which can be formed in thin film circuits. This acceptable resolution may be unattainable.

Figure 3:
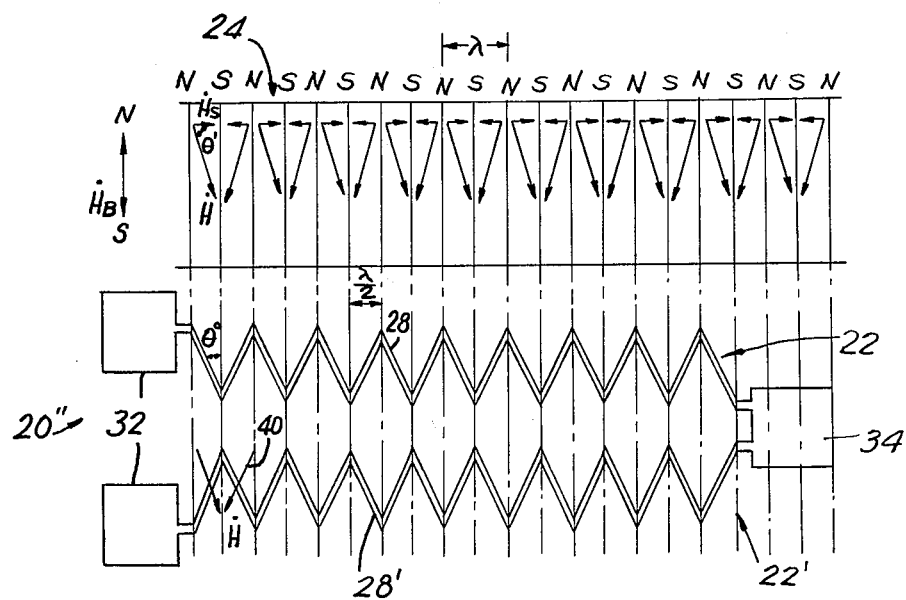
FIG. 3 is a magnetoresistive displacement sensor according to the prior art which uses magnetoresistive stripes disposed in a repeating triangular wave pattern which are exposed to a bias magnetic field.

Referring now to FIG. 3, there is shown a further embodiment of a magnetoresistive sensor 20" in which groups 22 and 22' have stripes 28 and 28' respectively which are arranged as a repeating triangular wave having a wavelength equal to wavelength λ of magnetic grating 24 and in which the phase of the triangular wave in group 22 is opposite to the phase of the triangular wave in group 22'.

Stripes 28 and 28' make angles of φ and −φ with respect to a normal to magnetic grating 24. Input terminals 32 and output terminal 34 are used as shown in FIG. 1 for applying energizing voltage and for obtaining an output respectively.

A bias magnetic field vector $\vec{H}_B$ is applied in a direction substantially perpendicular to signal magnetic field vectors $\vec{H}_S$ of magnetic grating 24. Resultant plane magnetic field vectors $\vec{H}$ make angles of φ' with signal magnetic field vectors $\vec{H}_S$. The relationship between angle φ' of resultant magnetic field vector $\vec{H}$ and the angle $φ^0$ of stripes 28 is preferably as follows:

$$\phi^0 \approx 90° - \phi'$$

In the relative positions shown, stripes 28 of group 22 are substantially parallel to resultant magnetic field vectors $\vec{H}$ and thus experience maximum resistance. Conversely, stripes 28' of group 22' are intersected by resultant magnetic field vectors $\vec{H}$ as shown by arrows 40 and exhibit minimum resistance. As previously discussed, the embodiment shown in FIG. 3 has limitations on resolution and its output contains no information as to the direction of displacement. In addition, the arrangement of adjacent stripes 28 over a distance of λ/2 is believed to cause cancellation of the magnetoresistance effect.

Figure 4:
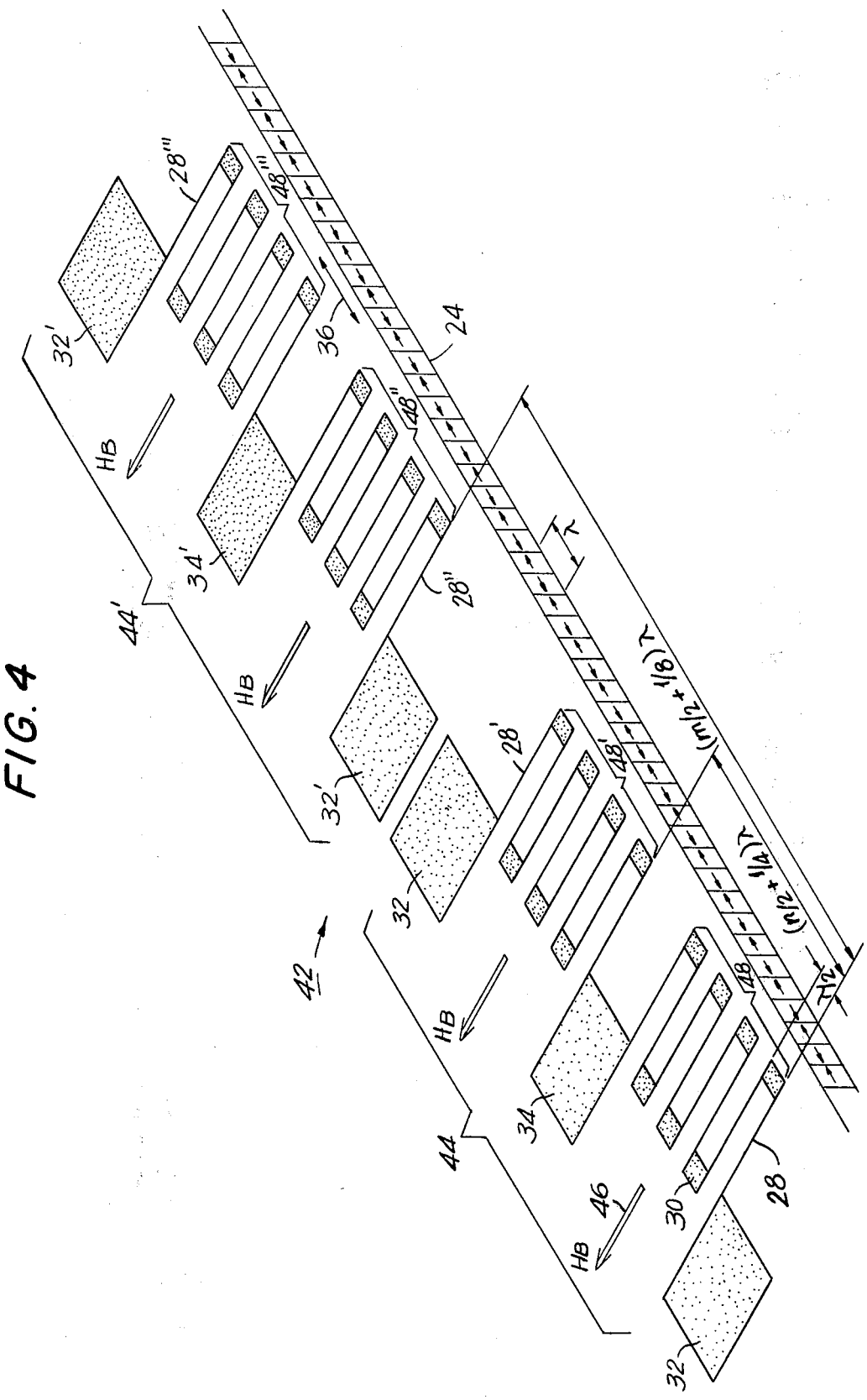
FIG. 4 is a schematic diagram of a magnetoresistive displacement sensor according to a first embodiment of the present invention.

Referring now to FIG. 4, there is shown a magnetoresistive displacement sensor 42 according to the present invention adjacent a magnetic grating 24 having a wavelength λ. Magnetoresistive displacement sensor 42 includes a first magnetoresistive sensor 44 having stripes 28 and 28' and a second magnetoresistive sensor 44' having stripes 28" and 28"' aligned in the direction of displacement indicated by double-headed arrow 36. Stripes 28, 28', 28" and 28"' are preferably deposited by thin-film techniques on a glass substrate Connecting conductors 30 are preferably deposited by thin-film techniques preferably using the same magneto-resistive material as is used in stripes 28. The increased width of connecting conductors 30 decreases their resistance (and change of resistance due to the presence and absence of a magnetic field) sufficiently that their magnetoresistive effect can be ignored. A bias magnetic field $H_B$ is applied to magnetoresistive displacement sensor 42 parallel to stripes 28 as indicated by double-bodied arrows 46. First magnetoresistive sensor 44 has a first group 48 of magnetoresistive stripes 28 and a second group 48' of magnetoresistive stripes 28'. Stripes 28 and 28' are spaced λ/2 from the next adjacent stripe within the same group. Corresponding stripes 28 and 28' in groups 48 and 48' are spaced apart (n/2+¼)λ where n equals 1, 2, 3, . . . As explained in connection with FIG. 1, each displacement in the direction of double-headed arrow 36 of λ/4 produces a 90° change in the output signal available at output terminal 34.

Second magnetoresistive sensor 44', similarly has groups 48" and 48'" of magnetoresistive stripes 28" and 28'" having the same relationships to stripes within the same group and its companion group as was true for stripes 28 and 28' in groups 48 and 48'. The spacing between corresponding stripes in groups 48 and 48' is described by $(m/2 + \frac{1}{8})\lambda$ where m is an integer.

As would be clear to one skilled in the art, the signals available at output terminals 34 and 34' are displaced from each other by 90° as magnetoresistive displacement sensor 42 is moved in either of the directions indicated by double-headed arrow 36. Improved resolution is obtained due to the fact that zero crossings spaced 90° apart can be detected in the signals at output terminals 34 and 34'. In addition, an indication of the direction of displacement is obtainable from the output signals.

The embodiment of the invention shown in FIG. 4 is especially effective when the magnetic fields of magnetic grating 24 are sufficiently large compared to the bias magnetic field $H_B$ to achieve saturation in the stripes.

Figure 5:
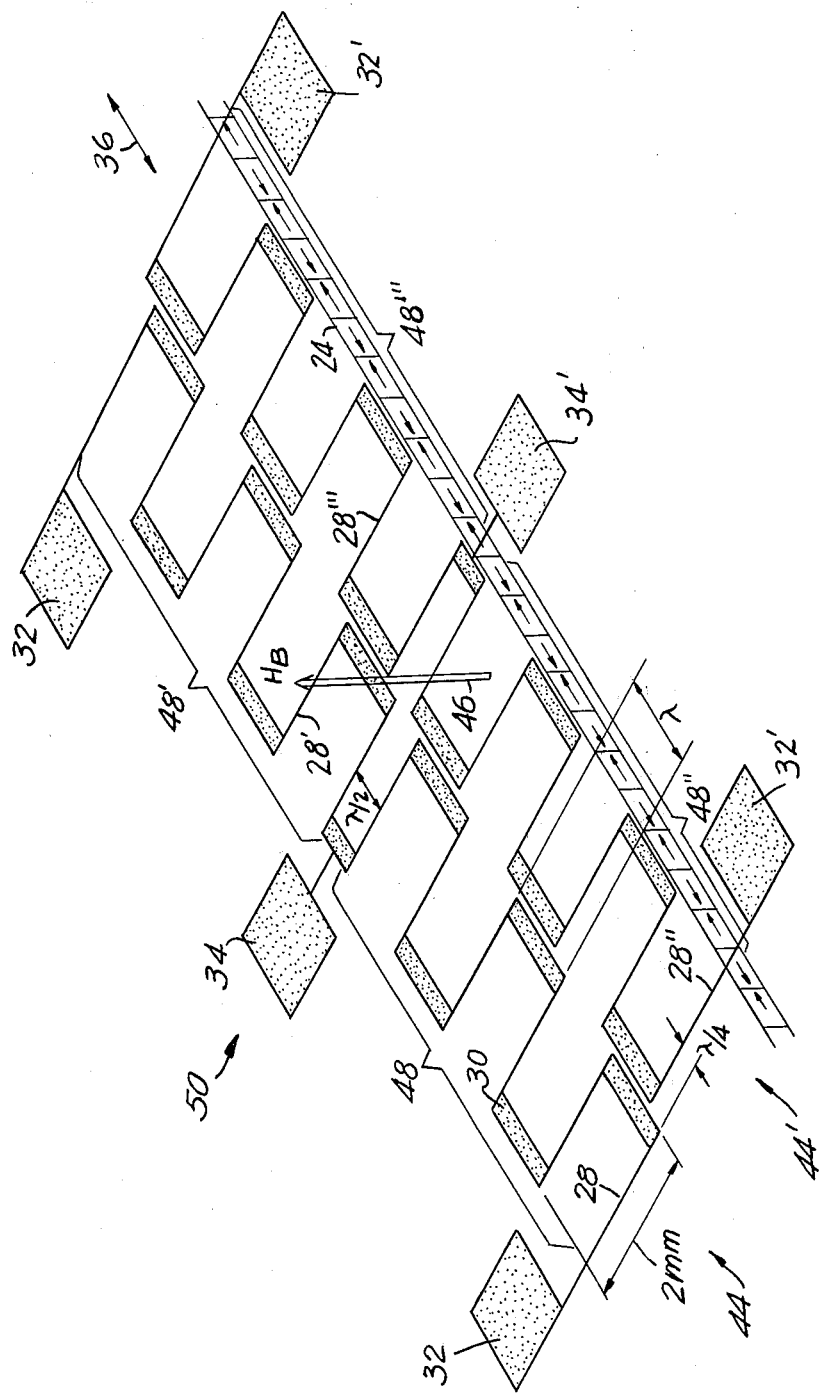
FIG. 5 is a magnetoresistive displacement sensor according to a second embodiment of the present invention.
Figure 6:
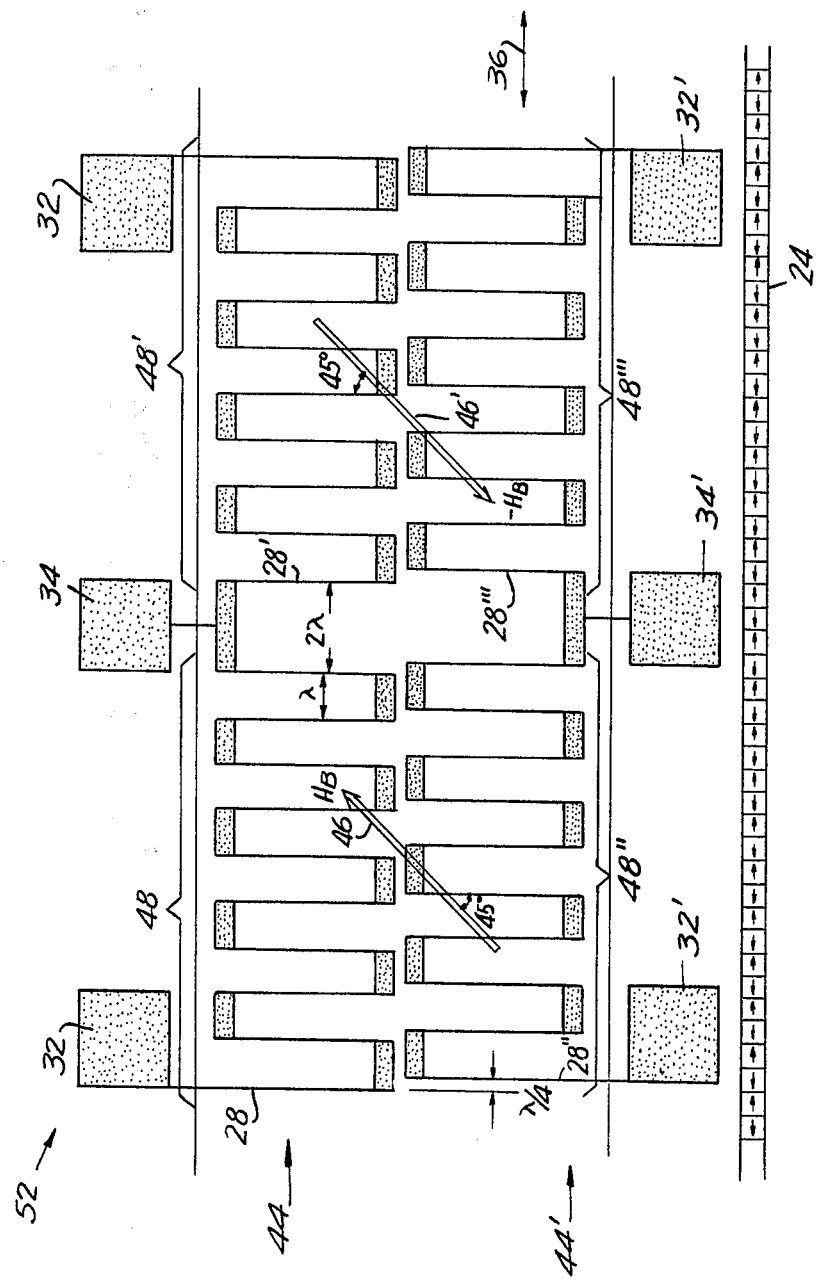
FIG. 6 is a schematic diagram of a magnetoresistive displacement sensor according to a third embodiment of the present invention.

Referring now to FIGS. 5 and 6, there are shown a further embodiment of a magnetoresistive displacement sensor 50 (52) according to the present invention. Stripes 28 within group 48, 28' within group 48', 28" within group 48" and 28'" within group 48'" are spaced λ apart and corresponding stripes within the two groups 48 and 48' of first magnetoresistive sensor 44 as well as 48" and 48'" of second magnetoresistive sensor 44' are spaced $m\lambda + \lambda/2$ (or $m\lambda + 2\lambda$) apart. In addition, due to the spacing of λ between adjacent stripes in a group, corresponding stripes, such as 28 and 28" in first and second magnetoresistive sensors 44 and 44' are spaced $(n + \frac{1}{4})\lambda$ apart. This spacing may be achieved, as in FIG. 4, by end-to-end arrangement of first and second magnetoresistive sensors 44 and 44' or alternatively, it can be achieved as shown in FIGS. 5 and 6 by side-by-side arrangement thereof. In the arrangement shown in FIGS. 5 and 6, n equals 0, but n may have other values. This bias magnetic field $H_B$ as indicated by double-bodied arrow 46 (46') is disposed at an angle of 45° to stripes 28, 28', 28" and 28'". Opposite bias fields are shown in FIG. 6 for groups 48, 48"and 48', 48'". As previously described, this aids in reducing the temperature coefficient of magnetoresistance.

Magnetoresistive displacement sensor 50 in FIG. 5 produces two outputs with a phase difference of 90° at output terminals 34 and 34'. The outputs at output terminals 34 and 34' go through one full cycle in response to displacement of one wavelength λ of magnetic grating 24 in the direction shown by double-headed arrow 36. Zero crossings of the output signals from output terminals 34 and 34' occur when the resistances of associated groups of stripes of a magnetoresistive sensor 44 or 44' are equal. Thus, when the resistance of group 48 equals the resistance of 48', a zero crossing is sensed.

Figure 7:
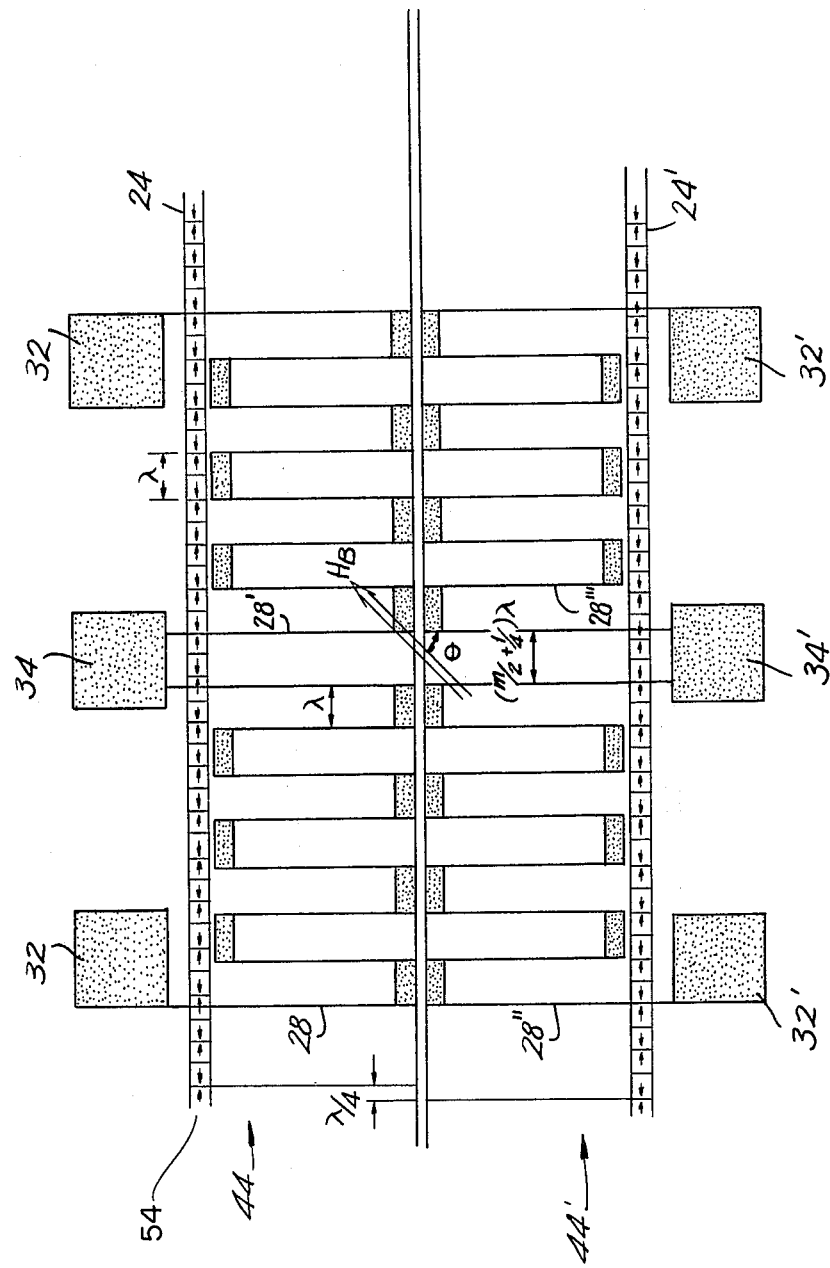
FIG. 7 is a schematic diagram of a magnetoresistive displacement sensor according to a fourth embodiment of the present invention.

Referring now to FIG. 7, there is shown a magnetoresistive displacement sensor 54 in which corresponding stripes 28 and 28' in first magnetoresistive sensor 44 are aligned with stripes 28" and 28'" respectively in second magnetoresistive sensor 44'. Two magnetic gratings 24 and 24' respectively influence first and second magnetoresistive sensors 44 and 44'. Magnetic gratings 24 and 24' are displaced $(m/2 + \frac{1}{4})\lambda$ or $(m/2 + \frac{1}{8})\lambda$ with respect to each other according to the techings herein. In the embodiment shown, magnetic gratings 24 and 24' are displaced λ/4 with respect to each other thus providing an effective phase difference in the output signal from output terminals 34 and 34' respectively of 90°. Bias magnetic field $H_B$ is preferably disposed at an angle φ equal to 45° with respect to stripes 28, 28', 28" and 28'".

Figure 8:
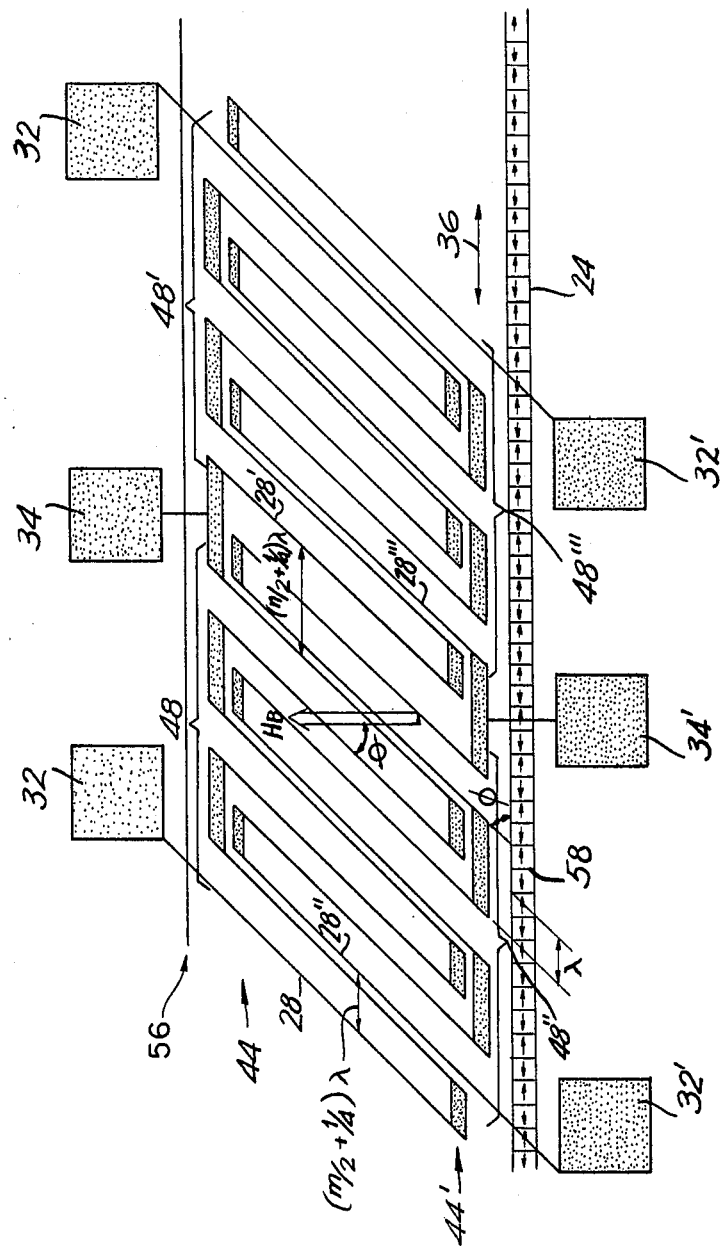
FIG. 8 is a schematic diagram of a magnetoresistive displacement sensor according to a fifth embodiment of the present invention.

Referring now to FIG. 8, there is shown a magnetoresistive displacement sensor 56 in which first and second magnetoresistive sensors 44 and 44' are interlaced. As previously discussed, the distance between adjacent stripes, for example, stripes 28 in first magnetoresistive sensor 44 may be any integral multiple of a half wavelength. In the embodiment of FIG. 8, the spacing alternates between λ and 2λ whereby group 48 is interlaced with group 48" and group 48' is interlaced with group 48'" by aligning and interlacing stripes spaced λ apart in one group with stripes spaced 2λ apart in the companion group. As previously discussed, first and second magnetoresistive sensors 44 and 44' are offset λ/4 in the direction of displacement indicated by double-headed arrow 36. Such interlacing reduces the area occupied by magnetoresistive displacement sensor 56.

The embodiment of FIG. 8 also includes divisions 58 defining the magnetic poles of magnetic grating 24 which are skewed to an angle φ with respect to the direction of displacement indicated by double-headed arrow 36. By disposing divisions 58 of magnetic grating 24 on the diagonal, the effective width of magnetic grating 24 is increased relative to the size of the actual width of magnetic grating 24. Stripes 28, 28', 28" and 28'" are also disposed at an angle φ. Bias magnetic field $H_B$ may be disposed at an angle θ relative to the stripes. In the condition shown in FIG. 8, the angle θ of bias magnetic field $H_B$ is 45° and the angle φ of the stripes and divisions 58 of magnetic grating 24 is 45°. This produces a result similar to FIG. 5. If angle θ is zero (that is, bias magnetic field $H_B$ aligned with the stripes) performance similar to the embodiment of FIG. 4 is obtained.

Figure 9:
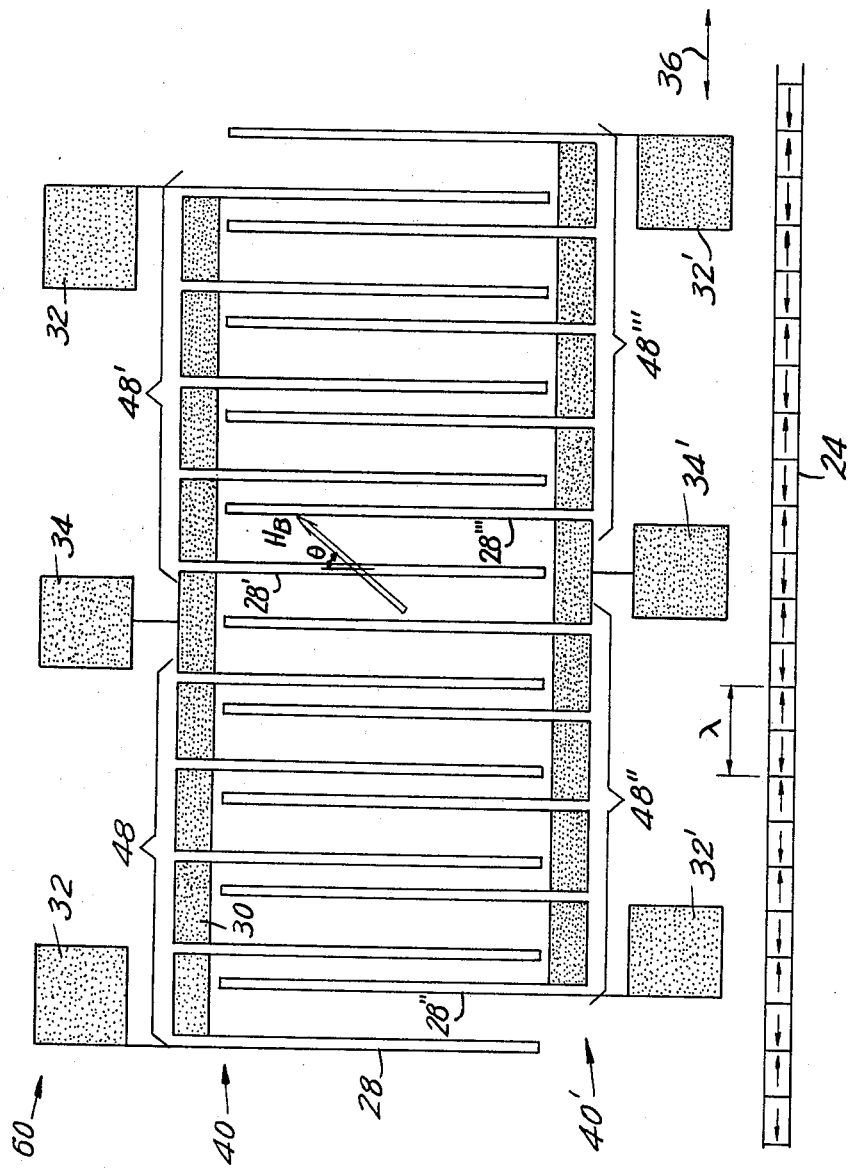
FIG. 9 is a schematic diagram of a magnetoresistive displacement sensor according to a sixth embodiment of the present invention.

Referring now to FIG. 9, a further embodiment of a magnetoresistive displacement sensor 60 is shown which permits increasing the number of stripes 28, 28', 28" and 28'" exposed to the magnetic field of magnetic grating 24 in an interlaced system. It will be noted that pairs of stripes are disposed very close to each other whereby the leakage magnetic flux from magnetic grating 24 acts equally upon both members of the pair. This effectively doubles the magnetoresistive effect as compared to a single stripe 28 in the same location. Such stripe pairs are spaced according to the rules previously described for single stripes. In the embodiment of FIG. 9, the stripe pairs are spaced λ apart. Each group, 48, 48', 48" and 48'" of magnetoresistive stripes is shown to include a total of ten stripes 28, 28', 28" and 28'" respectively and is thus more strongly influenced by magnetoresistive effect. It will be noted that the relatively wide connecting conductors 30 are present only at one end of each stripe. Although wide connecting conductor could be used at the closed end of the pairs of stripes, due to the close spacing of the stripes and the consequent shortness of connection therebetween, any magnetoresistive effect in the connecting portion would be minimal and the additional width of connecting conductor may be omitted.

Figure 10:
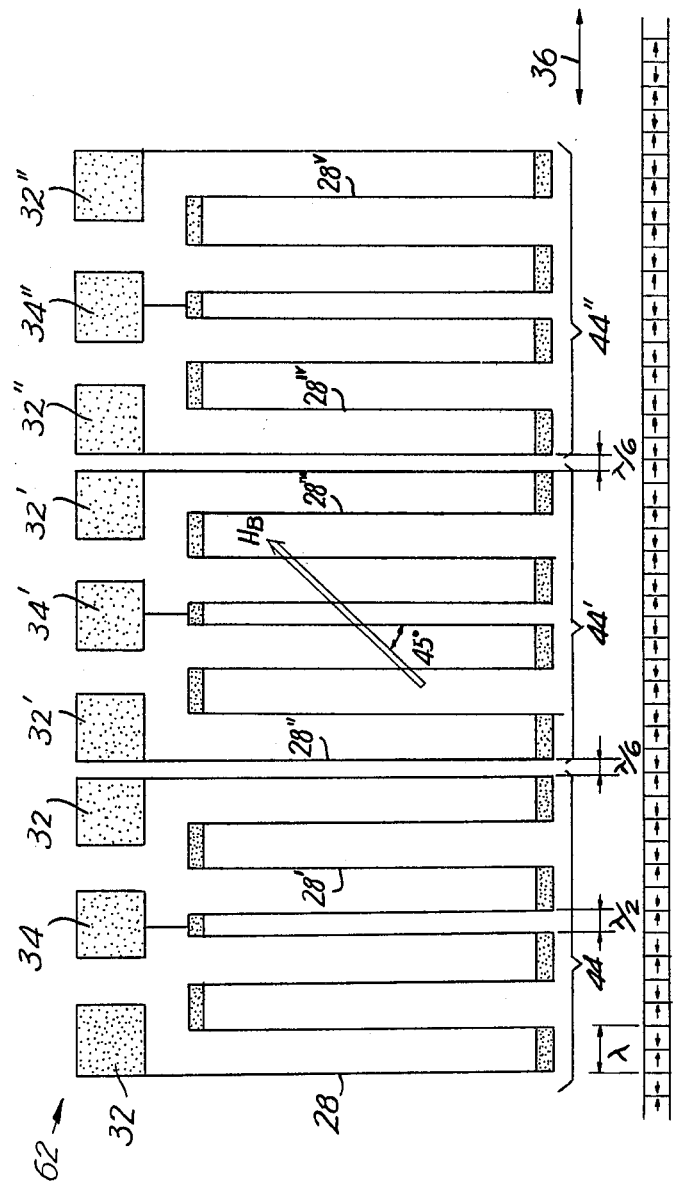
FIG. 10 is a schematic diagram of a magnetoresistive displacement sensor according to a seventh embodiment of the present invention.

The embodiments of the invention shown in FIGS. 4–9 produce four zero crossings during displacement of the magnetoresistive displacement sensor 42, 50, 52, 54, 56 or 60 during displacement of one wavelength λ thus producing an output every 90° of λ. Further improvement in resolution may be obtained using a magnetoresistive displacement sensor 62 as shown on FIG. 10. First, second and third magnetoresistive sensors 44, 44' and 44", each similar to those previously described, are disposed side-by-side. A spacing of λ/6 is provided between the nearest stripes of adjacent sensors. As would be evident to one skilled in the art in the light of the preceding disclosure, such spacing provides three signals at output terminals 34, 34' and 34" which are 60° apart. This provides six zero crossings per wavelength λ and a consequent resolution of 60°. Appropriate signal processing is capable of improving this resolution by a factor of two to provide 30° resolution as will be described. Such resolution improvement is disclosed in Japanese Patent Application Publication No. 2258/73.

Figure 11:
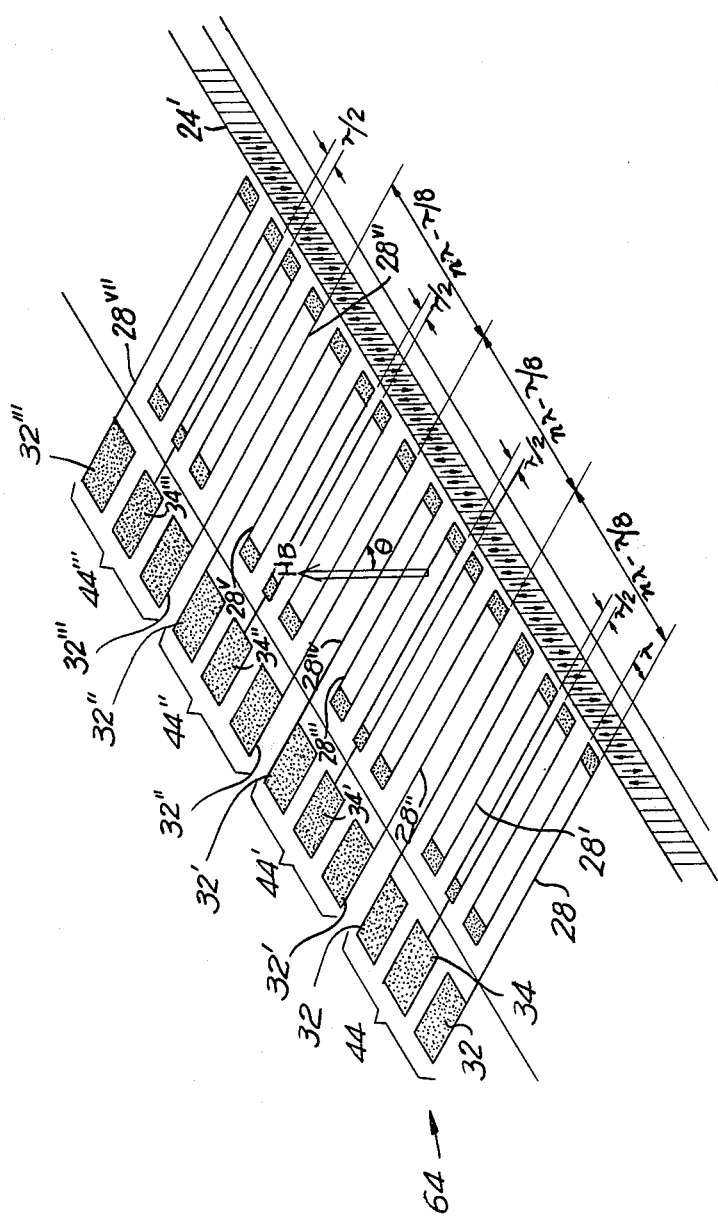
FIG. 11 is a schematic diagram of a magnetoresistive displacement sensor according to an eighth embodiment of the present invention.

Referring now to FIG. 11, an embodiment of a magnetoresistive displacement sensor 64 includes four magnetoresistive sensors 44, 44', 44" and 44''' having a spacing between corresponding stripes of adjacent sensors equal to $(n-\frac{1}{8})\lambda$. In light of the preceding disclosure, it would be clear that this provides zero crossings at output terminals 34, 34', 34" and 34''' every 45 degrees. Signal processing can improve this resolution by a factor of two to provide resolution of 22.5°.

The embodiment shown on FIG. 11 also includes magnetic fields in magnetic grating 24' which extend transverse to the divisions thereof as shown by the small arrows in magnetic grating 24'.

Figure 12:
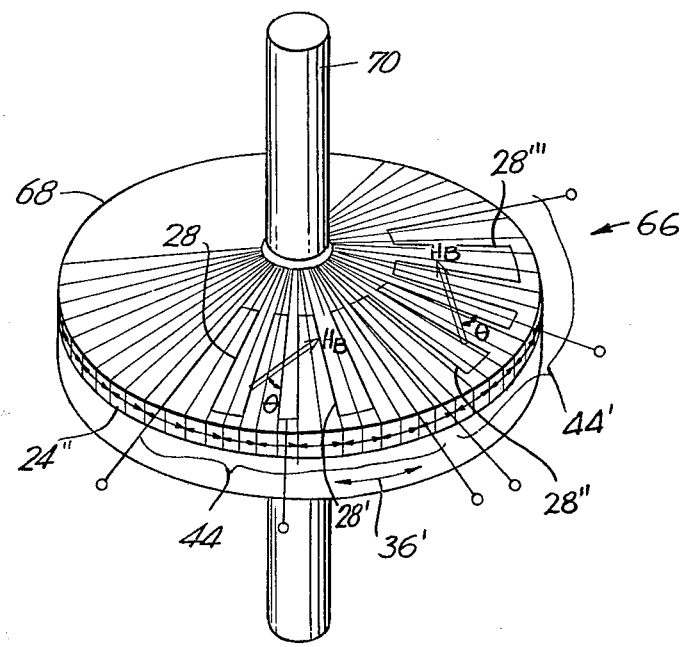
FIG. 12 is a magnetoresistive displacement sensor according to an embodiment of the invention especially adapted for sensing rotation.

Any of the preceding embodiments can be applied to a rotation sensor as shown in FIG. 12. A magnetoresistive rotation sensor 66 may include the magnetic grating 24" affixed to a rotating member such as a disc 68. Disc 68 may rotate in the direction shown by double-headed arrow 36' on a shaft 70 in proximity to first and second magnetoresistive sensors 44 and 44'. Except for the fact that stripes 28, 28', 28" and 28''' and the divisions of magnetic grating 24" are disposed along radii of disc 68 and that bias magnetic field $H_B$ must be oriented with its angle $\theta$ relative to radii of disc 68, magnetoresistive rotation sensor 66, functions identically to the magnetoresistive displacement sensors previously described and will not be further discussed.

Referring to FIGS. 13A–13L, a signal processing method will be described which improves the resolution of the two-output devices shown in FIGS. 4, 5, 6, 7, 8, 9 and 12 by a factor of two employing only zero crossing as indicators of position. Although the outputs of the magnetoresistive sensors previously described are usually sinusoidal, for convenience of description, it is assumed that these signals are triangular waves. Signal (A), which may be from first magnetoresistive sensor 44 in the previously described embodiments, describes one full cycle as displacement of one wavelength λ occurs. A second signal (B) which may be from second magnetoresistive sensor 44' in preceding embodiments lags signals (A) by 90°. If zero crossings alone were used to provide the displacement or rotational resolution, four points displaced 90° apart would be provided.

Figure 13A:
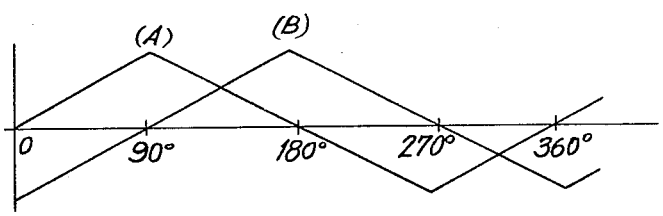
FIGS. 13A-13L are waveforms to which reference will be made in describing the manner in which resolution is improved using interpolation.
Figure 13B:
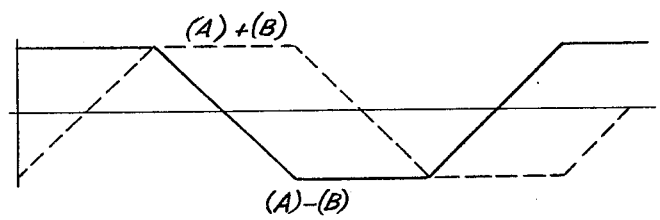
Figure 13C:
Figure 13D:
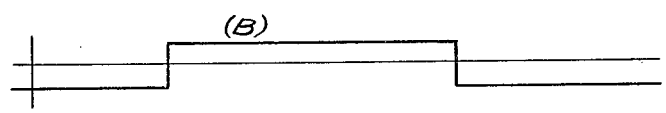
Figure 13E:
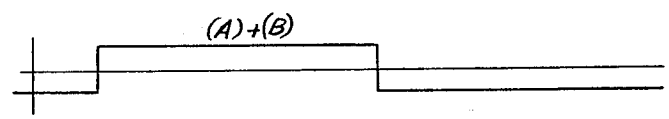
Figure 13F:
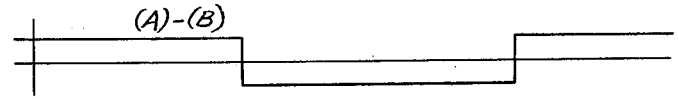
Figure 13G:
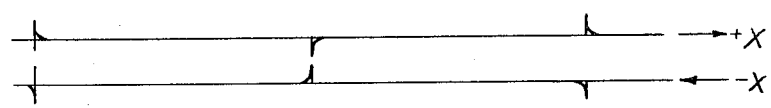

If the sum and difference of signals (A) and (B) are taken as shown on FIG. 13B, resolution can be improved by a factor of two. The difference (A)−(B) is shown in solid line and the sum (A)+(B) is shown in dashed line. It will be noted that the sum and difference signals add four additional zero crossings intermediate the zero crossings of signals (A) and (B) shown on FIG. 13A. When all eight zero crossings are used, resolution of 45° is obtained.

Figure 14:
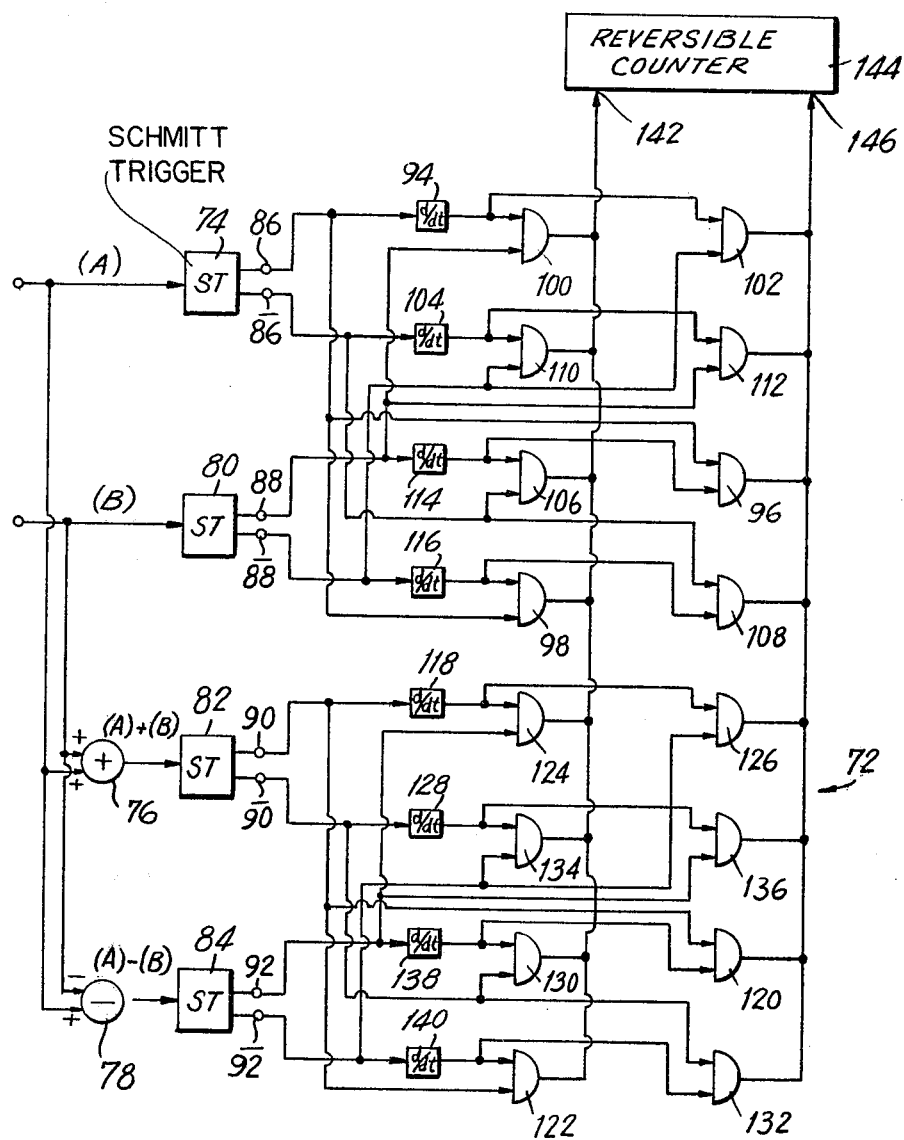
FIG. 14 is a logic diagram of a signal processing circuit for improving resolution through interpolation.

Referring now also to FIG. 14, there is shown a signal processing circuit 72 for producing the improved resolution discussed in the preceding. Signal (A) is applied to an input of a Schmitt trigger 74, to a plus input of an adder 76 and to a plus input of a subtractor 78. Signal (B) is applied to an input of a Schmitt trigger 80, to a plus input of adder 76 and to a minus input of subtractor 78. The output of adder 76 is applied to an input of a Schmitt trigger 82. The output of subtractor 78 is applied to a Schmitt trigger 84. Each of Schmitt triggers 74, 80, 82, and 84 provide a direct output 86, 88, 90 and 92 respectively and an inverted output $\overline{86}$, $\overline{88}$, $\overline{90}$ and $\overline{92}$, respectively. Direct output 86 is applied to a differentiating circuit 94 and to one input of each of AND gates 96 and 98. The output of differentiating circuit 94 is applied to one input of each of AND gates 100 and 102. Inverted output $\overline{86}$ is applied to a differentiating circuit 104 and to one input of each of AND gates 106 and 108. The output of differentiating circuit 104 is applied to one input of each of AND gates 110 and 112. Direct output 88 is applied to an input of a differentiating circuit 114 and to an input of each of AND gates 100 and 112. Inverted output $\overline{88}$ is applied to an input of a differentiating circuit 116 and to one input of each of AND gates 110 and 102. Direct output 90 is applied to an input of a differentiating circuit 118 and to one input of each of AND gates 120 and 122. The output of differentiating circuit 118 is applied to one input of each of AND gates 124 and 126. Inverted output $\overline{90}$ is applied to an input of a differentiating circuit 128 and to one input of each of AND gates 130 and 132. The output of differentiating circuit 128 is applied to AND gates 134 and 136. Direct output 92 is applied to an input of a differentiating circuit 138 and to one input of each of AND gates 136 and 124. The output of differentiating circuit 138 is applied to one input of each of AND gates 130 and 120. Inverted output $\overline{92}$ is applied to an input of a differentiating circuit 140. The output of differentiating circuit 140 is applied to one input of each of AND gates 122 and 132. The outputs of AND gates 100, 110, 106, 98, 124, 134, 130 and 122 are applied to a first input 142 of a reversible counter 144. The outputs of AND gates 102, 112, 96, 108, 126, 136, 120 and 132 are applied to a second input 146 of reversible counter 144.

As is well known, a Schmitt trigger provides a first output level whenever its input signal is below a predetermined voltage, such as zero volts, and a second output level when its input is above the predetermined voltage. For purposes of description, it is assumed that Schmitt triggers 74, 80, 82 and 84 switch their outputs as their input signals pass through zero in the positive and negative directions. Thus, the direct outputs $\overline{86}$, $\overline{88}$, $\overline{90}$ and $\overline{92}$ of Schmitt triggers 74, 80, 82 and 84 are shown in FIGS. 13C, 13D, 13E, and 13F. Inverted outputs 86, 88, 90 and 92 are the inverse of the signals shown in FIGS. 13C–13F. The outputs of differentiating circuits 94 and 104 are shown in the upper portion of FIG. 13G when displacement occurs in the plus X direction. The output of differentiating circuit 104 is represented as a negative going spike for clarity. However, it would be clear that, in fact, the output of differentiating circuit 104, since it operates on inverted output 86 would be a positive going spike. Due to the gating applied by the AND gates, the spikes represented as positive going, are applied to input 146 of reversible counter 144 and those represented as negative going are applied to input 142 of reversible counter 144. When displacement is in the minus X direction, the outputs of differentiating circuits 94 and 104 are as represented in the lower curve of FIG. 13G. It will be noted that the positive and negative directions of the spikes are reversed with reversal in direction. Thus the opposite one of inputs 142 and 146 receive signals depending upon the direction of displacement or rotation.

Figure 13H:
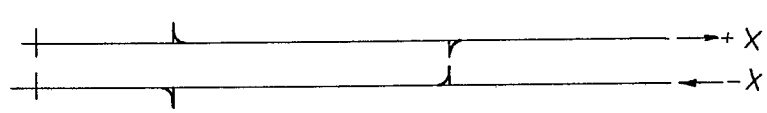
Figure 13I:
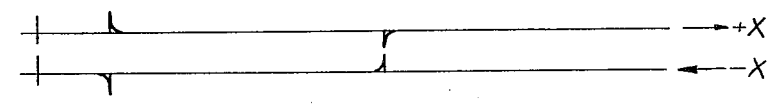
Figure 13J:
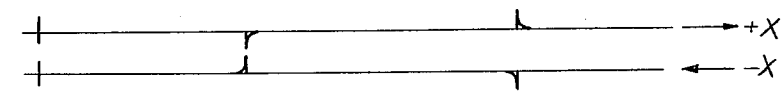
Figure 13K:
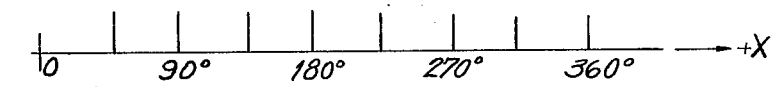
Figure 13L:

FIG. 13H shows the signals applied to reversible counter 144 as a result of outputs from AND gates 96, 98, 106 and 108 gated by differentiated direct and inverted outputs 88 and $\overline{88}$ produced by zero crossings of signal (B). Similarly, FIG. 13I shows inputs to reversible counter 144 from AND gates 124, 126, 134 and 136 gated by zero crossings of (A)+(B). FIG. 13J shows the inputs to reversible counter 144 from AND gates 120, 122, 130 and 132 resulting from zero crossings of (A)−(B). Reversible counter 144 keeps track of its inputs and the direction of the same to contain an updated count representative of the current displacement or rotational angle in increments of 45° as shown in FIGS. 13K for motion in the plus X direction and 13L for motions in the minus X direction.

Figure 15A:
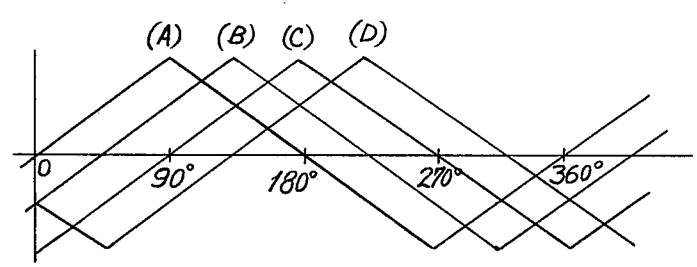
FIGS. 15A-15E are waveform diagrams to which reference will be made in describing a four-output magnetoresistive displacement sensor.
Figure 15B:
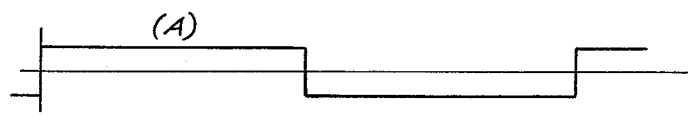
Figure 15C:
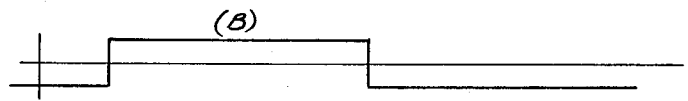
Figure 15D:
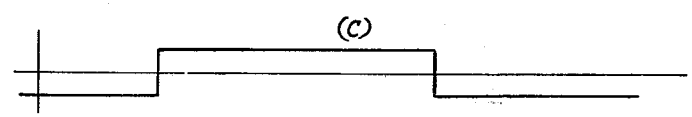
Figure 15E:
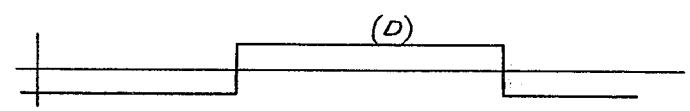

When a magnetoresistive displacement sensor such as sensor 64 in FIG. 11 has four magnetoresistive sensors 44, 44′, 44″ and 44‴, the four outputs thereof (A), (B), (C) and (D) as shown in FIG. 15A produce eight zero crossings per wavelength of the magnetic grating to provide a resolution of 45°. The outputs of Schmitt triggers (not shown) responsive to signals (A), (B), (C) and (D) are shown respectively in FIGS. 15B–15E.

FIGS. 16A–16S show how the 45 degree resolution available from four signals, such as (A), (B), (C) and (D) which are displaced from each other by 45 degrees can be improved to a resolution of 22.5 degrees. The four signals are shown in FIG. 16A. FIG. 16B shows signal (A)−(B) in solid line, signal (A)+(D) in dashed line, signal (B)−(C) in dot-dashed line and signal (C)−(D) in dash and double dot line. FIGS. 16C–16J show outputs of Schmitt triggers (not shown) which are fed signals (A), (B), (C), (D), (A)−(B), (B)−(C), (C)−(D), and (A)+(D), respectively. As can be seen in FIGS. 16K–16S, signals equivalent to those shown in FIG. 14 are capable of producing an output pulse every 22.5 degrees of motion along a magnetic grating in the direction of displacement. Since the production of the spike signals in FIGS. 16K–16R to produce counting inputs shown in FIG. 16S would be clear to one skilled in the art in the light of the disclosure of a similar circuit operating on two input signals shown in FIG. 14, the apparatus for producing the signals shown in FIGS. 16B–16S is not shown or described.

Figure 17A:
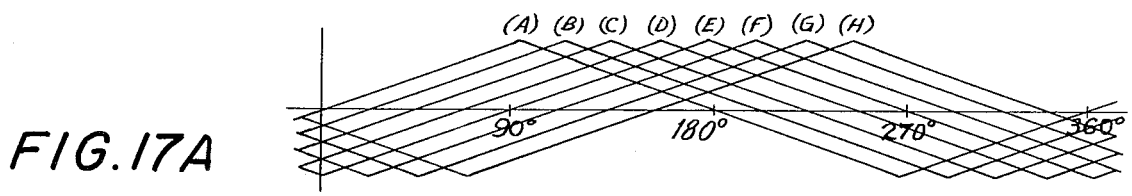
FIGS. 17A-17R are waveforms showing some of the signals in a magnetoresistive displacement sensor and signal processing circuit therefor which uses eight output signals to provide 22.5 degree resolution.
Figure 17B:
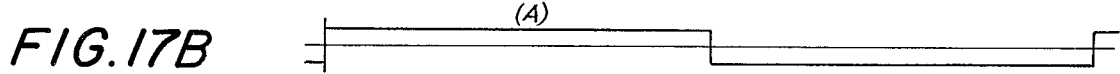
Figure 17C:
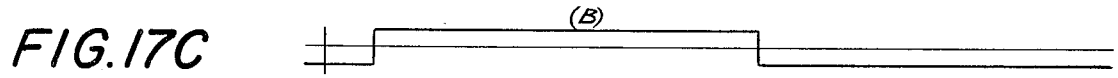
Figure 17D:
Figure 17E:
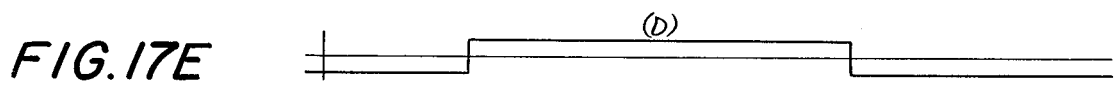
Figure 17F:
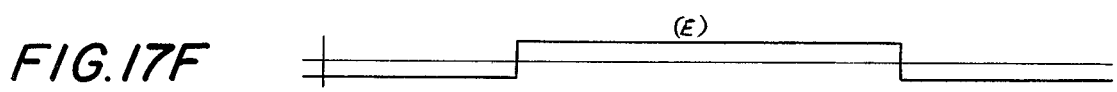
Figure 17G:
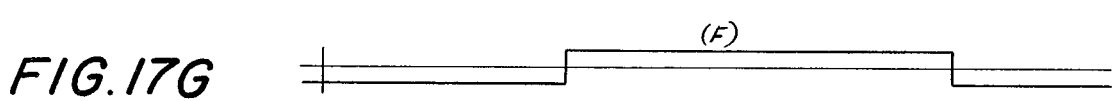
Figure 17H:
Figure 17I:
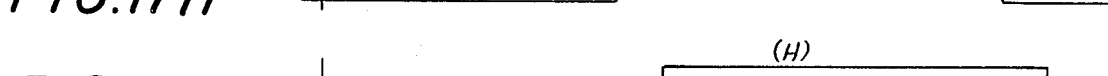
Figure 17J:
Figure 17K:
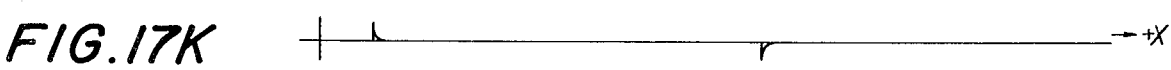
Figure 17L:
Figure 17M:
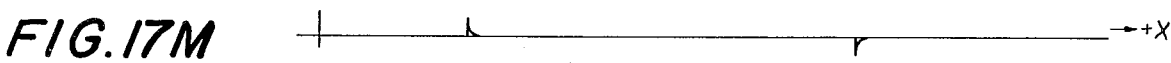
Figure 17N:
Figure 17O:
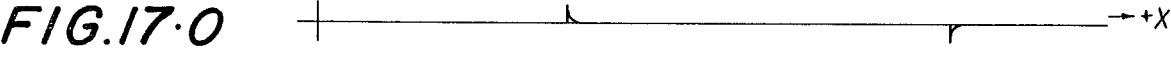
Figure 17P:
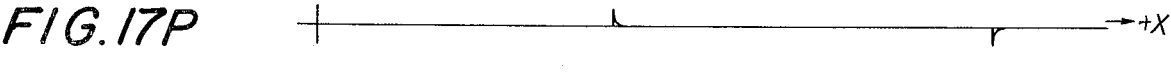
Figure 17Q:
Figure 17R:
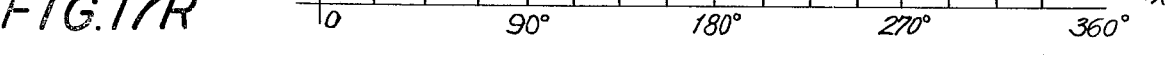

A more direct method of obtaining 22.5 degree resolution in shown in FIGS. 17A–17R. As illustrated in FIG. 17A, eight separate signals (A), (B), (C), (D), (E), (F), (G) and (H) spaced 22.5 degrees aparat are applied to Schmitt triggers (not shown) to produce the signals shown on FIGS. 17B–17I. FIGS. 17J–17R show the signals produced for application to a reversible counter (not shown) for motion over one wavelength in the plus X direction. The signals applied to the reversible counter for rotation in the minus X direction are not shown but they would be clear to one skilled in the art from the preceding disclosure. The above arrangement using eight signals to obtain 22.5 degree resolution is beneficial since adder and subtractor circuits are not required and thus a simple circuit is satisfactory.

Figure 18:
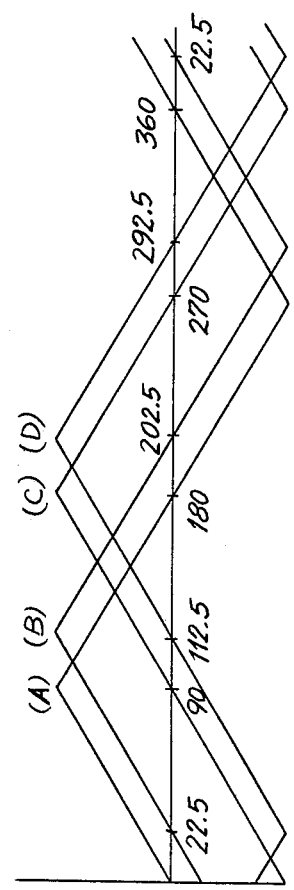
FIG. 18 is a waveform diagram including four output signals of a magnetoresistive displacement sensor to which reference will be made in describing another way in which 22.5 degree resolution is obtained.

Another way of achieving resolution of 22.5 degrees, shown in FIG. 18, uses only signals (A) and (B) spaced 90° apart, signal (C) lagging (A) by 22.5° and signal (D) lagging (B) by 22.5°. The manner in which the signals in FIG. 18 are employed to achieve 22.5 degree resolution is as follows:

| | |
|---|---|
| (A) signal | $V_A = E_1 \sin(n\lambda + \theta)$ |
| (B) signal | $V_B = E_1 \sin(n\lambda + \theta - \pi/2)$ |
| (A) + (B) signal | $V_{A+B} = E_2 \sin(n\lambda + \theta - \pi/4)$ |
| (A) − (B) signal | $V_{A-B} = E_2 \sin(n\lambda + \theta + \pi/4)$ |
| (C) signal | $V_C = E_1 \sin(n\lambda + \theta - \pi/8)$ |
| (D) signal | $V_D = E_1 \sin(n\lambda + \theta - 5\pi/8)$ |
| (C) + (D) signal | $V_{C+B} = E_2 \sin(n\lambda + \theta - 3\pi/8)$ |
| (C) − (D) signal | $V_{C-D} = E_2 \sin(n\lambda + \theta + \pi/8)$ |

Although use of the signals shown in FIG. 18 is somewhat different from the use of signals shown on FIG. 16 to achieve 22.5 degree resolution, the results are identical.

Figure 19:
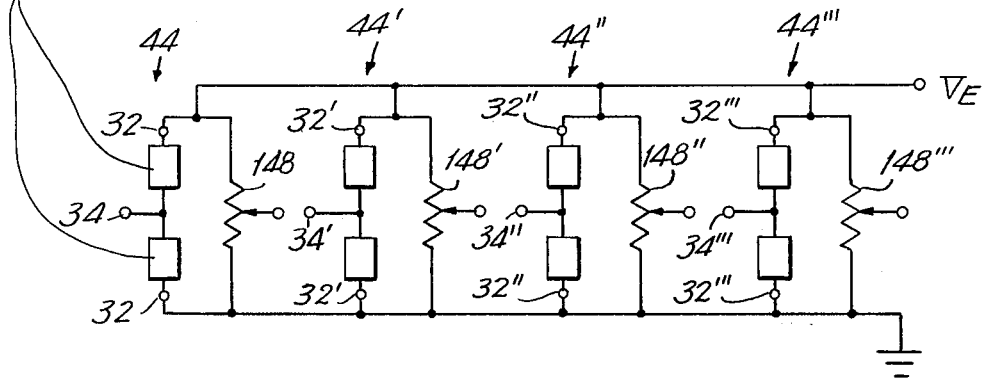
FIG. 19 is a schematic diagram of one way in which magnetoresistive displacement sensors may be connected in a circuit.
Figure 20:
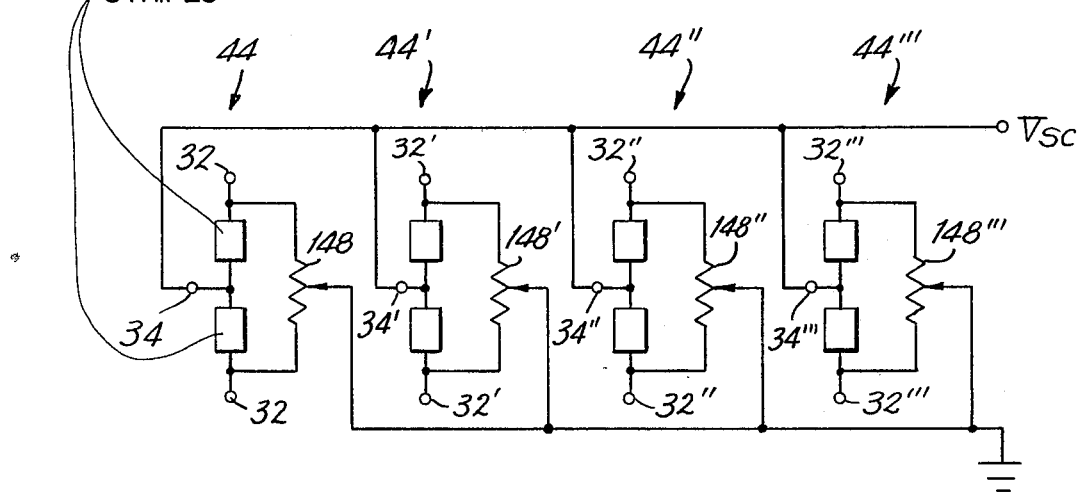
FIG. 20 is a schematic diagram of another arrangement of magnetoresistive displacement sensors in a circuit.

FIGS. 19 and 20 show two possible ways in which a plurality of magnetoresistive sensors, for example, four magnetoresistive sensors 44, 44′, 44″ and 44‴ may be connected together to provide outputs to signal processing circuits. Variable resistors 148, 148′, 148″ and 148‴ permit balancing the signals. In FIG. 19, the individual outputs are provided by output terminals 34, 34′, 34″ and 34‴ and a common output may be either ground or energizing voltage $V_E$.

Figure 21:
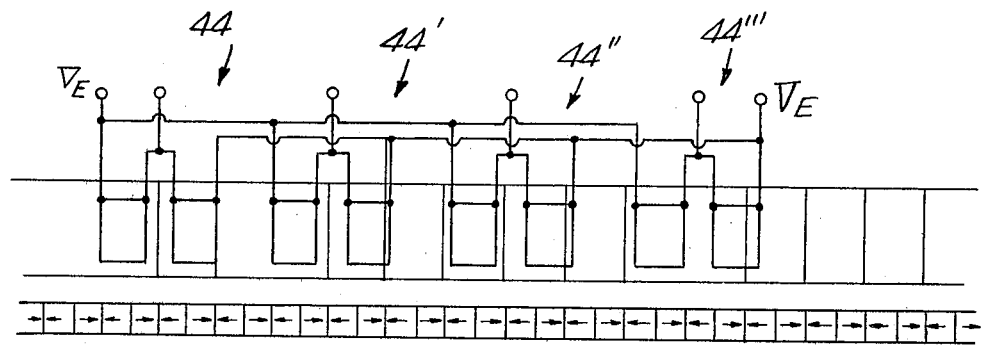
FIG. 21 is a schematic diagram of another arrangement of magnetoresistive displacement sensors in a circuit.
Figure 22:
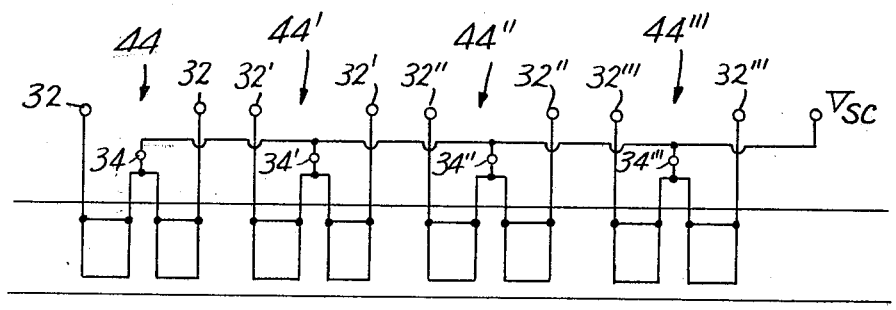
FIG. 22 is a schematic diagram of another arrangement of magnetoresistive displacement sensors in a circuit.

In FIG. 20, the common signal voltage $V_{SC}$ is provided from output terminals 34, 34′, 34″ and 34‴. The individual outputs may be taken from one of input terminals 32, 32′, 32″ and 32‴ of each magnetoresistive displacement sensor 44, 44′, 44″ and 44‴. As shown in FIGS. 21 and 22, the number of external connections required are drastically reduced.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A magnetoresitive displacement sensor for use with at least one elongated magnetic grating having a wavelength, comprising:

a first magnetoresistive sensor operative to produce a first output signal in response to displacement thereof with respect to said at least one magnetic grating;

a second magnetoresistive sensor operative to produce a second output signal in response to the displacement thereof with respect to said at least one magnetic grating;

each of said first and second magnetoresistive sensors having parallel stripes of magnetoresistive material disposed in serpentine configuration with two adjacent stripes spaced apart from each other by a predetermined integral multiple of one-half said wavelength;

said first and second magnetoresistive sensors being fixed relative to each other and having a relative spacing therebetween substantially equal to a predetermined fraction of said wavelength;

a bias magnetic field applied to said first and second magnetoresistive sensors; and the combination of said bias magnetic field and said relative spacing between said sensors being effective to produce a relative phase difference between said first and second output signals of substantially less than 180 degrees.

2. A magnetoresistive displacement sensor according to claim 1; wherein the serpentine configured stripes include first and second groups of parallel stripes, adjacent stripes included in said first group being spaced apart from each other by n/2 λ, where λ is said wavelength and n=1, 2, 3 . . . , and said first and second groups having a spacing between corresponding parallel stripes thereof of (m/2+1/k)λ, where m=0, 1, 2, 3 . . . and k=2, 3, 4, 5 . . . .

3. A magnetoresistive displacement sensor according to claim 1; wherein each of said first and second magnetoresistive sensors includes connecting conductors operative to connect said parallel stripes in series, said connecting conductors being integrally formed with said parallel stripes and having a width substantially greater than a width of said stripes whereby a magnetoresistive effect therein is reduced.

4. A magnetoresistive displacement sensor according to claim 1; wherein said bias magnetic field has a direction parallel to said stripes.

5. A magnetoresistive displacement sensor according to claim 1; wherein said bias magnetic field has a direction disposed at an angle of 45 degrees to said stripes.

6. A magnetoresistive displacement sensor according to claim 1; wherein said magnetic grating has magnetic domains having divisions, said divisions are at an angle to the direction of elongation, and said parallel stripes in said first and second magnetoresistive sensors are parallel to said angle.

7. A magnetoresistive displacement sensor according to claim 6; wherein said bias magnetic field has a direction parallel to said angle.

8. A magnetoresistive displacement sensor according to claim 6; wherein said bias magnetic field has a direction at an angle of about 45 degrees to said angle.

9. A magnetoresistive displacement sensor according to claim 1; wherein said first and second magnetoresistive sensors are disposed end to end in the elongated direction of said magnetic grating.

10. A magnetoresistive displacement sensor according to claim 1; wherein said first and second magnetoresistive sensors are disposed side by side transverse to the elongated direction of said magnetic grating.

11. A magnetoresistive displacement sensor according to claim 1; wherein said first and second magnetoresistive sensors each include a plurality of parallel stripes connected in series to form at least one U-shaped loop, said at least one U-shaped loop of said first magnetoresistive sensor being interlaced with said at least one U-shaped loop of said second magnetoresistive sensor.

12. A magnetoresistive displacement sensor according to claim 11; wherein said plurality of stripes in at least one of said first and second magnetoresistive sensors includes at least two stripes which are so close together that they are substantially equally influenced by a single portion of said magnetic grating, and said at least two stripes form said U-shaped loop which is interlaced with a U-shaped loop in the other magnetoresistive sensor.

13. A magnetoresistive displacement sensor comprising:

a magnetic grating having a plurality of magnetic poles disposed in a displacement direction;

said magnetic grating having a wavelength;

a first plurality of parallel magnetoresistive stripes having a spacing between adjacent stripes equal to integral multiples of half said wavelength;

a second plurality of parallel magnetoresistive stripes having a spacing between adjacent stripes equal to integral multiples of half said wavelength;

a spacing between corresponding ones of said first and second pluralities of parallel magnetoresistive stripes substantially equal to a predetermined multiple n of a quarter of said wavelength and effective to produce a magnetoresistive phase difference therein equal to 180 degrees;

means for applying energizing current in series through said first and second plurality of parallel magnetoresistive stripes;

means for obtaining a first output signal at a junction of said first and second plurality of parallel magnetoresistive stripes;

said first and second plurality of parallel magnetoresistive stripes forming a first magnetoresistive sensor;

at least a second magnetoresistive sensor the same as said first magnetoresistive sensor including means for obtaining a second output signal;

said first and second magnetoresistive sensors being fixedly spaced from each other and relatively displaceable with respect to said plurality of magnetic poles;

a bias magnetic field applied to said first and second magnetoresistive sensors; and said first and second magnetoresistive sensors being disposed at a relative spacing in the direction of displacement equal to a multiple of a fraction of said wavelength which, in combination with said bias magnetic field, produces a phase difference in said first and second output signals of less than 180 degrees.

14. A magnetoresistive displacement sensor according to claim 13; wherein said phase difference in said first and second output signals is equal to 180 degrees divided by the number of said magnetoresistive sensors.

15. A magnetoresistive displacement sensor according to claim 13; wherein said phase difference in said first and second output signals is equal to 90 degrees.

* * * * *